Jan. 22, 1963
G. ALFIERI
3,074,382
PRESSURE CONTROL DEVICE, PARTICULARLY IN
MOTOR VEHICLE INSTALLATIONS
Filed May 10, 1960
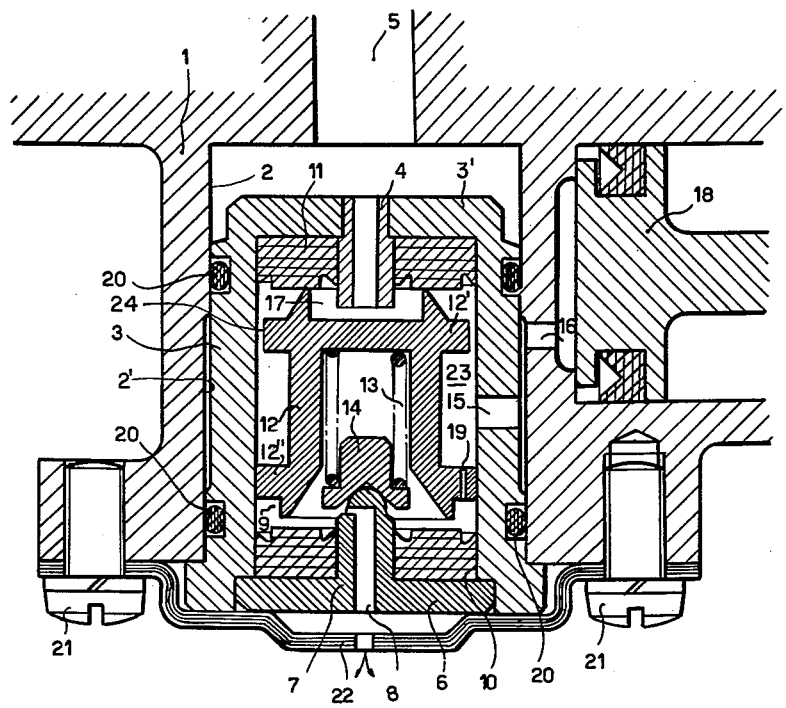
INVENTOR.
Giuseppe Alfieri
BY Michael S. Striker
Attorney United States Patent Office 3,074,382
Patented Jan. 22, 1963

3,074,382
PRESSURE CONTROL DEVICE, PARTICULARLY IN MOTOR VEHICLE INSTALLATIONS
Giuseppe Alfieri, Milan, Italy, assignor to Fabbrica Italiana Magneti Marelli S.p.A., Milan, Italy, a firm
Filed May 10, 1960, Ser. No. 28,137
Claims priority, application Italy May 23, 1959
4 Claims. (Cl. 121—38)

The invention deals with pressure control devices employed in pneumatic circuits, particularly of motor vehicle installations, and essentially comprised of a cylinder with a piston, air tight elements, valve ports, and connections to the other elements.

It is commonly known that these apparatuses are situated between the compressed air reservoir tank, and the servo control of the compressor idling device, and have the function of limiting the pressure in the reservoir tank to a maximum value, and provoking the opening of the exhaust valves when the pressure has reached the pre-established limit value.

The conventional type of regulators are normally assembled with the cleaning control unit of the pneumatic plant, and constitute with the latter an inseparable assembly. It follows therefore, that in the case of disassembly due to breakdowns or for checking of the unit, the pressure controller is consequently also affected; this can happen even in connection with an adjustment. The operating personnel often is not sufficiently competent to avoid incorrect adjustment so that the functioning of the entire apparatus may be impaired.

The object of the present invention is to eliminate the above-mentioned defect, and to provide an improved regulator of simple construction, which guarantees complete protection of all its members.

The regulator, according to the invention, is arranged in its own individual casing in such a manner that it can be installed or extracted from the cleaning control unit without interfering with the other units of the installation.

In this manner, in the event of breakdowns, the above-mentioned disadvantage is avoided, since it is possible to dismantle the complete regulator, and substitute another one already previously assembled and calibrated by the manufacturers. As a consequence, there is also the advantage of being able to carry out a perfect repair in a very short time, and at the same time have a spare regulator.

The rapid assembly of the spare regulator is due to the fact that simple annular packings and a shaped metal strap held by screws, for example, are sufficient to mount it in the body of the cleaning control unit.

All the members of the device are enclosed in a cylindrical casing furnished with a suitable cover, which can be caulked or rolled onto the cylinder in such a manner, that the regulator once calibrated and mounted on the installation need not be touched during operations.

Another constructional feature of the regulator consists in the fact that the resilient element of the regulator seals comprises two equal packings resting on the bottom and the cover of the casing, respectively, which permits establishing the sealing seats on the mobile piston valve where the machining may be carried out with the precision and finish required.

The invention will now be further illustrated and described, by way of example only, with reference to the attached drawing, which shows a longitudinal section of the control device conforming to the invention.

The cleaning control unit illustrated comprises a body or housing 1 having a bore 2 for receiving the pressure control device, the bore 2 being provided with an enlarged portion 2'. The pressure control device comprises a cylindrical casing 3 formed in the shape of a cup, and communicating through pipe 4 situated in its bottom wall 3', and conduit 5 located in correspondence with the same in the body 1, with the compressed air tank not shown in the drawing.

At the opposite side from the bottom, casing or cylinder 3 is closed in a permanent manner by a cover lid 6 furnished with a cylindrical projection 7, in which is located a bore 8 to establish communication between a lower end chamber 9 and the atmosphere. An air seal packing 10 is installed around the projection 7 and rests against the internal surface of the cover lid 6.

Another packing 11 is situated at the bottom wall 3' of cylinder 3 around pipe 4. In the interior of the cylinder and between the packings 10 and 11 is mounted a piston valve 12, subjected at one side to the air pressure of the reservoir tank, and at the opposite side to the action of an opposing spring 13, which rests in turn on one of its sides on the bottom of the piston, and on its other side on a support member 14 positioned on the projection 7.

The piston valve 12 is provided with a pair of flanges 12', 12" defining an annular chamber 23 therebetween. Flange 12' is somewhat smaller in diameter than the bore 2 of housing 1 so that an annular passage 24 is formed.

The apparatus communicates through port 15, the enlarged bore portion 2', and a port 16 with the pneumatic servo control which acts on the compressor exhaust valve. An opening 19 is provided in flange 12".

In operation, spring 13 normally maintains piston valve 12 in its upper position so as to act as a seal against packing 11, but as the compressed air pressure tank becomes loaded, pressure will gradually increase in pipe 5 and hence in an upper end chamber 17, creating a pneumatic action on piston valve 12 in contrast to spring 13. When the pressure in the end chamber 17 reaches a pre-established calibrated value, the pneumatic action overcomes the opposing action of the spring; the piston valve moves away from the seat corresponding to packing 11, and is pushed downwards until the opposite seat is closed. The compressed air in chamber 17 can then flow through the passage 24 between valve 12 and casing 3 and activate through passages 15, 25 and 16 the piston 18 of the pneumatic servo control, which opens the exhaust valve and thus causes the compressor to idle. In this manner, the pressure in the reservoir tank is no longer increased.

When, on the other hand, following withdrawal of the air from the reservoir tank, the pressure in the end chamber 17 diminishes, the action of spring 13 prevails over the pneumatic force, and piston valve 12 is pushed against seal 11, the air feeding piston 18 of the servo control exhausts to the atmosphere through passages 16, 15, 19 and 8 and normal load conditions are re-established in the air reservoir tank.

Cylinder 3 containing the piston valve, spring, etc. is closed in a permanent manner by means of caulking or rolling of cover 6; in this manner the regulator becomes a unit which can easily be mounted or may be used as a spare. It is obvious that the cover can be joined to the cylinder, also, by means of screws or other dismountable devices.

Assembled in this manner, the unit constituting the control device is fitted into bore 2, 2' with the aid of packings 20.

The unit is secured in position by means of the shaped metal strap 22 applied to cover 6, and held by screws 21 engaging housing 1 of the cleaning control unit.

I claim:
1. In a pressure control device for a pneumatic system having a pressure reservoir, in combination, a housing; a cylindrical casing tightly and removably fitted in said housing, said casing having a bottom wall and an open end opposite said bottom wall; a cover secured to said casing and closing said open end thereof; a pair of passage means coaxial with said casing and respectively arranged in said cover and said bottom wall to respectively provide through said cover communication between the atmosphere and the interior of said casing and to provide through said bottom wall communication between the interior of said casing and said pressure reservoir; valve means movably arranged in said casing for alternately closing said pair of passage means, said valve means defining together with the inner surfaces of said casing and said cover a pair of end chambers and an annular chamber intermediate said end chambers and said valve means being formed with further passage means providing communication between said end chambers and said annular chamber; additional passage means in said housing and said casing and communicating with said annular chamber; spring means operatively connected to said valve means and tending to move said valve means toward said bottom wall; and fastening means for fastening said casing to said housing.

2. In a pressure control device for a pneumatic system having a pressure reservoir, in combination, a housing formed with a bore open at one end and communicating with the pressure reservoir at the other end thereof; a cylindrical casing removably mounted in said bore of said housing and fluid-tightly engaging the cylindrical surface of said bore, said casing having a bottom wall facing said other end of said bore and an open end opposite said bottom wall; a cover secured to said casing and closing said open end thereof; a pair of passage means coaxial with said casing and respectively arranged in said cover and said bottom wall to respectively provide through said cover communication between the atmosphere and the interior of said casing and to provide through said bottom wall communication between the interior of said casing and said pressure reservoir; valve means located in said cylindrical casing movable in direction of the axis of the latter for alternatively closing said pair of passage means, said valve means defining together with the inner surface of the casing and said cover a pair of end chambers and an annular chamber intermediate said end chambers and said valve means being formed with further passage means providing communication between said end chambers and said annular chamber; additional passage means in said housing and said casing and communicating with said annular chamber; spring means operatively connected to said valve means and tending to move the same towards said bottom wall; and fastening means for fastening said casing to said housing.

3. In a pressure control device for a pneumatic system having a pressure reservoir, in combination, a housing formed with a bore open at one end and communicating with the pressure reservoir at the other end thereof; a cylindrical casing removably mounted in said bore of said housing and fluid-tightly engaging the cylindrical surface of said bore, said casing having a bottom wall facing said other end of said bore and an open end opposite said bottom wall; a cover secured to said casing and closing said open end thereof; a pair of passage means coaxial with said casing and respectively arranged in said cover and said bottom wall to respectively provide through said cover communication between the atmosphere and the interior of said casing and to provide through said bottom wall communication between the interior of said casing and said pressure reservoir; a pair of sealing means in said casing respectively abutting against said bottom wall and said cover and arranged about said passage means through said bottom wall and said cover; a valve body having opposite ends and being located in said casing movable in axial direction thereof between a first position in which said valve body engages one of said sealing means so as to close one of said pair of passage means and a second position in which the other end of said valve body engages the other of said sealing means so as to close the other of said pair of passage means, said valve body being formed, spaced from said opposite ends thereof, with a pair of annular flanges defining with the inner surface of said casing and said sealing means, respectively, a pair of end chambers and between themselves an annular chamber intermediate said end chambers, the outer peripheral surface of one of said flanges being slightly spaced from the inner surface of said casing to define therewith a small annular gap and the other of said flanges being formed with a small bore therethrough to provide communication between said end chambers and said annular chambers; additional passage means in said housing and said casing and communicating with said annular chamber; spring means operatively connected to said valve means and tending to move the same towards said bottom wall; and fastening means for fastening said casing to said housing.

4. An arrangement as defined in claim 1 and including a cylinder formed in said housing; and a control piston slidably arranged in said cylinder and said additional passage means communicating with said cylinder at one side of said piston.

References Cited in the file of this patent

UNITED STATES PATENTS

| | | |
|---|---|---|
| 2,610,859 | Wilcox | Sept. 16, 1952 |
| 2,897,790 | Lee | Aug. 4, 1959 |
| 2,922,432 | Huntington | Jan. 26, 1960 |